United States Patent
Huff et al.

(10) Patent No.: US 6,946,004 B2
(45) Date of Patent: Sep. 20, 2005

(54) USE OF GRAFTED POLYALKYLENE OXIDES AS GREYING INHIBITORS WHEN WASHING

(75) Inventors: Jürgen Huff, Ludwigshafen (DE); Bernhard Mohr, Heidelberg (DE); Axel Kistenmacher, Bad Duerkheim (DE); Sebastian Koltzenburg, Waldsee (DE); Christine Müller, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 281 days.

(21) Appl. No.: 10/362,360

(22) PCT Filed: Aug. 30, 2001

(86) PCT No.: PCT/EP01/10000

§ 371 (c)(1),
(2), (4) Date: Feb. 27, 2003

(87) PCT Pub. No.: WO02/18526

PCT Pub. Date: Mar. 7, 2002

(65) Prior Publication Data

US 2003/0186833 A1 Oct. 2, 2003

(30) Foreign Application Priority Data

Aug. 30, 2000 (DE) .......................... 100 42 815

(51) Int. Cl.$^7$ ...................... D06M 11/00; D06M 11/58; D06M 14/00
(52) U.S. Cl. ............................ 8/181; 8/115.6; 8/116.4; 8/127.6; 8/115.58; 8/137
(58) Field of Search .................. 8/115.6, 181, 116.4, 8/127.6, 115.58, 137

(56) References Cited

U.S. PATENT DOCUMENTS

| 4,612,352 A | | 9/1986 | Schaefer et al. | |
| 4,746,456 A | | 5/1988 | Kud et al. | |
| 4,849,126 A | * | 7/1989 | Kud et al. | 510/276 |
| 4,904,408 A | * | 2/1990 | Kud et al. | 510/360 |
| 5,318,719 A | | 6/1994 | Hughes et al. | |

FOREIGN PATENT DOCUMENTS

| DE | 0 087 671 | 9/1983 |
| EP | 0 219 048 | 4/1987 |
| EP | 0 285 037 | 10/1988 |
| EP | 0 285 038 | 10/1988 |
| EP | 0 953 347 | 11/1999 |
| EP | 1 125 954 | 8/2001 |
| WO | 91 19778 | 12/1991 |
| WO | 00 18375 | 4/2000 |

* cited by examiner

*Primary Examiner*—Brian P. Mruk
(74) *Attorney, Agent, or Firm*—Oblon, Spivak, McClelland, Maier & Neustadt, P.C.

(57) ABSTRACT

The invention relates to the use of grafted polymers as greying inhibitors during the washing and aftertreatment of textile goods. Said polymers are obtained by polymerising A) 10 to 95 wt. % of grafted monomers containing, in relation to A), a) 1 to 99 wt. % of at least one vinyl ester, b) 1 to 99 wt. % of at least one N-vinyl lactam, c) 0 to 90 wt. % of at least one other monoethylenically unsaturated monomer which can be copolymerized with monomers a) and b), and d) 0 to 5 wt. % of at least one monomer having at least two ethylenically unsaturated, non-conjugated double bonds in the molecule, in the presence of A) 5 to 90 wt. % of at least one polymer B), chosen from polyalkylene oxides containing at least 3 units of a $C_2$ to $C_4$ alkylene oxide, and polytetrahydrofuranes containing at least 3 units of tetramethyl oxide units, and the mixtures thereof.

18 Claims, No Drawings

USE OF GRAFTED POLYALKYLENE OXIDES AS GREYING INHIBITORS WHEN WASHING

BACKGROUND OF THE INVENTION

1. Field of the Invention

The invention relates to the use of graft polymers obtainable by polymerization of A) 10 to 95% by weight of graft monomers A) comprising, based on A),
  a) 1 to 99% by weight of at least one vinyl ester,
  b) 1 to 99% by weight of at least one N-vinyllactam,
  c) 0 to 90% by weight of at least one other monoethylenically unsaturated monomer copolymerizable with the monomers a) and b), and
  d) 0 to 5% by weight of at least one monomer having at least two ethylenically unsaturated, nonconjugated double bonds in the molecule in the presence of B) 5 to 90% by weight of at least one polymer B) chosen from polyalkylene oxides which contain at least 3 units of a $C_2$–$C_4$-alkylene oxide, and polytetrahydrofurans which contain at least 3 tetramethylene oxide units, and mixtures thereof, as graying inhibitors in the washing and aftertreatment of textile ware.

The invention further relates to the use of said graft polymers as grayness-inhibiting additive in laundry detergents, and to laundry detergents which comprise these graft polymers.

2. Description of the Background

Graying is caused by soil, fat or dye particles to the laundry item which have been detached during the washing process reattaching from the wash liquor. In most cases, this process is irreversible; subsequent washing is unable to remove this soil again. Graying occurs in particular in the case of fabrics which contain synthetic fibers, in particular in the case of textiles which contain polyester fibers. Phosphates are essential detergent constituents and have a water-softening action and, moreover, act as graying inhibitors. Because of legislative measures, it is necessary in some countries to greatly reduce the content of phosphates in detergents, or to offer phosphate-free detergents. The absence of the phosphates leads to more considerable graying.

This is countered by special phosphate-free additives which have a grayness-inhibiting action in the detergent. Some of these additives also improve the soil release during the washing operation and thus improve the washing result.

WO-A-00/18375 discloses graft polymers as coatings or bindings in pharmaceutical administration forms such as tablets, capsules, etc. The graft polymers are obtained by polymerization of vinyl esters of $C_1$–$C_{24}$-carboxylic acids and optionally N-vinyllactams in the presence of polyethers. The use as graying inhibitor in detergents is not described.

EP-A 87 671 discloses the use of ungrafted copolymers of vinyl esters of a $C_1$–$C_4$-carboxylic acid, N-vinyllactam, monomers containing basic groups, and optionally comonomers as graying inhibitors in the washing and aftertreatment of textile ware which contains synthetic fibers.

EP-A 219 048 discloses the use of graft polymers as graying inhibitors in the washing and aftertreatment of textile ware which contains synthetic fibers. The graft polymers are obtained by grafting polyalkylene oxides with vinyl acetate.

EP-A 285 037 discloses an identical use where the graft polymers are obtained by grafting polyalkylene oxides which are terminally capped at one end with an ester chosen from vinyl esters of a saturated $C_1$–$C_6$-monocarboxylic acid, methyl and ethyl esters of acrylic acid and methacrylic acid.

EP-A 285 038 discloses an identical use where the graft polymers are obtained by grafting polyalkylene oxides with N-vinylpyrrolidone and an ester chosen from vinyl esters of a saturated $C_1$–$C_6$-monocarboxylic acid, methyl and ethyl esters of acrylic acid and methacrylic acid.

The grayness-inhibiting action of the four last-named polymers of the prior art is generally satisfactory. However, the soil release properties of these polymers are inadequate in many cases, i.e. these polymers do not always facilitate soil release during the washing process to an adequate degree.

SUMMARY OF THE INVENTION

It is an object of the invention to overcome the disadvantages described. In particular, the aim was to provide polymers whose soil release action has been improved.

In particular, it is the object to provide polymers which have better soil release while retaining good grayness inhibition, i.e. the improved soil release properties should not be achieved at the expense of the grayness inhibition.

DETAILED DESCRIPTION OF THE PREFERRED EMBODIMENTS

We have found that this object is achieved by the use defined at the outset. Furthermore, we have found the use of said graft polymers as grayness-inhibiting additive in laundry detergents, and also laundry detergents which comprise these graft polymers.

The graft polymers are obtainable by polymerizing graft monomers A) in the presence of polymers B). Accordingly, this graft polymerization involves the graft monomers A) being grafted onto the polymers B).

The proportion of graft monomers A) is 10 to 95% by weight, preferably 20 to 80% by weight, based on the total mass of monomers A) and polymers B). Accordingly, the proportion of the polymers B) is 5 to 90% by weight, preferably 20 to 80% by weight, based on said total mass.

The graft monomers A) comprise, based on A), a) 1 to 99% by weight, preferably 10 to 90% by weight and in particular 20 to 80% by weight, of at least one vinyl ester, b) 1 to 99% by weight, preferably 5 to 90% by weight and in particular 10 to 40% by weight of at least one N-vinyllactam, c) 0 to 90% by weight of at least one other monoethylenically unsaturated monomer copolymerizable with the monomers a) and b), and d) 0 to 5% by weight of at least one monomer having at least two ethylenically unsaturated, nonconjugated double bonds in the molecule.

It goes without saying that the sum of A) and B), and the sum of a) to d) is in each case 100% by weight.

Suitable vinyl esters a) are, for example, vinyl esters of saturated carboxylic acids having 1 to 20, in particular 1 to 6, carbon atoms. Examples are vinyl formate, vinyl acetate, vinyl propionate and vinyl butyrate. Preference is given to using vinyl acetate and vinyl propionate, in particular vinyl acetate. It is possible to use one vinyl ester on its own or a mixture of two or more vinyl esters.

Suitable N-vinyllactams b) are N-vinyllactams having 5 to 13 carbon atoms in the lactam ring. Examples are N-vinylbutyrolactam, N-vinylcaprolactam, N-vinylvalerolactam and N-vinyllaurolactam. Preference is given to using N-vinylcaprolactam. It is possible to use one N-vinyllactam on its own or a mixture of two or more N-vinyllactams.

The graft monomers A) can, moreover, optionally comprise the monomers c) and/or d).

If copolymerizable monomers c) are used, the amount preferably used is 5 to 80% by weight, in particular 10 to 60% by weight, based on the graft monomers A).

Suitable copolymerizable monomers c) (referred to below as comonomers) are, for example, vinylcarboxamides, such as N-vinylformamide, N-vinyl-N-methylformamide, N-vinylacetamide, N-vinyl-N-methylacetamide, N-vinyl-N-methylpropionamide and N-vinylpropionamide. Preference is given to using N-vinylformamide. The copolymerized monomer units may be partially or completely hydrolyzed.

Further suitable comonomers c) are the esters, amides and nitrites of monoethylenically unsaturated $C_3$- to $C_6$-carboxylic acids. Suitable amides are, for example, acrylamide, methacrylamide, and N-alkylmono- and -diamides having alkyl radicals of from 1 to 6 carbon atoms, such as N-methylacrylamide, N,N-dimethylacrylamide, N-methylmethacrylamide, N-ethylacrylamide, N-propylacrylamide and tert-butylacrylamide, and the basic (meth)acrylamides, such as dimethylaminoethylacrylamide, dimethylaminoethylmethacrylamide, diethylaminoethylacrylamide, diethylaminoethylmethacrylamide, dimethylaminopropylacrylamide, diethylaminopropylacrylamide, dimethylaminopropylmethacrylamide and diethylaminopropylmethacrylamide.

Other suitable comonomers c) are the esters of the monoethylenically unsaturated carboxylic acids with $C_1$- to $C_6$-alcohols, such as methyl acrylate, methyl methacrylate, ethyl acrylate and ethyl methacrylate, or with glycols or polyglycols, where in each case only one OH group of the glycols and polyglycols is esterified with an ethylenically unsaturated carboxylic acid, such as hydroxyethyl acrylate, hydroxyethyl methacrylate, hydroxypropyl acrylates, hydroxybutyl acrylate, hydroxypropyl methacrylates, hydroxybutyl methacrylates, and the acrylic monoesters of polyalkylene glycols having a molecular weight of from 1500 to 10,000. Also suitable are the esters of ethylenically unsaturated carboxylic acids with amino alcohols, such as dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate, diethylaminopropyl methacrylate, dimethylaminobutyl acrylate, diethylaminobutyl acrylate, dimethylaminopentyl acrylate, dimethylaminoneopentyl methacrylate and dimethylaminohexyl acrylate. The basic acrylates and acrylamides are used in the form of the free bases, the salts with mineral acids, such as, for example, hydrochloric acid, sulfuric acid and nitric acid, or in quaternized form. Suitable quaternizing agents are, for example, dimethyl sulfate, methyl chloride, ethyl chloride, benzyl chloride or diethyl sulfate.

Suitable comonomers c) are also monoethylenically unsaturated mono- and dicarboxylic acids (anhydrides) having 3 to 6 carbon atoms, such as acrylic acid, methacrylic acid, crotonic acid, maleic acid (anhydride), fumaric acid, itaconic acid (anhydride) and citraconic acid (anhydride).

Further suitable comonomers c) are N-vinylpyrrolidone, acrylonitrile, methacrylonitrile, N-vinylimidazole, and substituted N-vinylimidazoles, such as N-vinyl-2-methylimidazole, N-vinyl-4-methylimidazole, N-vinyl-5-methylimidazole, N-vinyl-2-ethylimidazole, and N-vinylimidazolines, such as N-vinylimidazoline, N-vinyl-2-methylimidazoline and N-vinyl-2-ethylimidazoline. N-vinylimidazoles and N-vinylimidazolines are used not only in the form of the free bases, but also in a form neutralised with mineral acids or in quaternized form, the quaternization preferably being carried out with dimethyl sulfate, diethyl sulfate, benzyl chloride, methyl chloride or ethyl chloride.

Finally, suitable comonomers c) are monomers containing sulfo groups, such as vinylsulfonic acid, allylsulfonic acid, methallylsulfonic acid, styrenesulfonic acid, 3-sulfopropyl acrylate, 3-sulfopropyl methacrylate and 2-acrylamido-2-methylpropanesulfonic acid. The compounds having acid groups can be used in the graft polymerization in the form of the free acids, the ammonium salts, alkali metal salts and alkaline earth metal salts.

Of the comonomers c), preference is given to acrylonitrile, N-vinylpyrrolidone, and acrylic acid.

It goes without saying that it is also possible to use mixtures of two or more comonomers c).

A modification of the graft copolymers can be achieved by copolymerizing the monomers a) and b) and optionally c) with a monomer d) having at least two ethylenically unsaturated nonconjugated double bonds in the molecule in the presence of the polymers B). The monomers d) are usually used in copolymerizations as crosslinkers. The co-use of the crosslinking monomers d) usually brings about an increase in the K values of the copolymers.

Where crosslinking monomers d) are used, the amount preferably used is 0.05 to 2% by weight, based on the graft monomers A).

Suitable crosslinking monomers d) are, for example, methylenebisacrylamide, esters of acrylic acid and methacrylic acid with polyhydric alcohols, e.g. glycol diacrylate, glyceryltriacrylate, glycol dimethacrylate, glyceryl trimethacrylate, and polyols at least diesterified with acrylic acid or methacrylic acid, such as pentaerythritol and glucose. Suitable crosslinkers are also divinylbenzene, divinyldioxane, pentaerythritol triallyl ether and pentaallyl sucrose. Preferred crosslinking monomers d) are water-soluble monomers, such, as glycol diacrylate or glycol diacrylates of polyethylene glycols having a molecular weight (number-average) of from 300 to 10,000.

It goes without saying that it is also possible to use mixtures of two or more crosslinking monomers d).

The polymerization of the graft monomers A) is carried out according to the invention in the presence of at least one polymer B) chosen from i) polyalkylene oxides which contain at least 3 units of a $C_2$–$C_4$-alkylene oxide, and ii) polytetrahydrofurans which contain at least 3 tetramethylene oxide units and mixtures of the polyalkylene oxides i) and the polytetrahydrofurans ii).

Such polyalkylene oxides i) and polytetrahydrofurans ii) are known.

Of particular interest are the homo- and copolymers of $C_2$–$C_4$-alkylene oxides. They are prepared, for example, by homo- or copolymerization of ethylene oxide, propylene oxide, n-butylene oxide and/or isobutylene oxide. The copolymers may either be random copolymers if mixtures of at least 2 alkylene oxides are polymerized, or block copolymers if firstly an alkylene oxide, for example ethylene oxide, is polymerized and then another alkylene oxide is polymerized, e.g. propylene oxide. The block copolymers can, for example, be assigned type AB, ABA or BAB, where A is, for example, a polyethylene oxide block and B is a propylene oxide block. These copolymers may also further contain n-butylene oxide and/or isobutylene oxide in copolymerized form.

The polyalkylene oxides i) contain at least 3 alkylene oxide units in the molecule. The polyalkylene oxide can contain, for example, up to 50,000 alkylene oxide units in the molecule.

Preference is given to those polyalkylene oxides which have 3 to 1000 alkylene oxide units in the molecule.

Preference is given to polyalkylene oxides having a number-average molecular weight of from 200 to 50,000, in particular 200 to 15,000.

The polytetrahydrofurans ii) contain at least 3 tetramethylene oxide units in the molecule, for example 3 to 200, preferably 3 to 100 tetramethyleneoxide units.

Preferred polymers B) are homo- or block copolymers of ethylene oxide and propylene oxide, and random copolymers of ethylene oxide and propylene oxide obtainable by copolymerization of a mixed gas of ethylene oxide and propylene oxide.

Particular preference is given to using homopolymers of ethylene oxide (=polyethylene glycols), in particular those having a number-average molecular weight of from 200 to 15,000.

For the purposes of the present invention, polyalkylene oxides is to be understood as also meaning addition products of $C_2$- to $C_4$-alkylene oxides with alcohols, carboxylic acids, phenols and amines. These addition products are obtained by reacting the $C_2$- to $C_4$-alkylene oxides with the corresponding alcohols, carboxylic acids, phenols or amines respectively.

Alcohols suitable for the reaction with the alkylene oxides have, for example, 1 to 30 carbon atoms, such as methanol, ethanol, n-propanol, isopropanol, n-butanol, n-octanol, 2-ethylhexanol, decanol, dodecanol, palmityl alcohol, cetyl alcohol and stearyl alcohol. Of industrial interest are, in particular, the alcohols obtainable by the oxo process, e.g. $C_{10}$-alcohols, $C_{13}$-oxoalcohols or natural alcohols such as $C_{10}/C_8$-tallow fatty alcohols. Apart from said monohydric alcohols, it is of course also possible to use di- and polyhydric alcohols, e.g. glycol, glycerol, erythritol, pentaerythritol and sorbitol. The alcohols are usually reacted in the molar ratio 1:3 to 1:200 with at least one $C_2$- to $C_4$-alkylene oxide.

Carboxylic acids suitable for the reaction with the alkylene oxides are, in particular, fatty acids, preferably those having 8 to 10 carbon atoms in the molecule. Examples are lauric acid, myristic acid, stearic acid, palmitic acid, coconut fatty acid, tallow fatty acid and oleic acid.

Phenols suitable for the reaction with the alkylene oxides are, for example, $C_1$- to $C_{12}$-alkylphenols, such as n-decylphenol, n-octylphenol, isobutylphenol and methylphenol.

Amines suitable for the reaction with the alkylene oxides are, for example, secondary $C_2$- to $C_{30}$-amines, such as di-n-butylamine, di-n-octylamine, dimethylamine and distearylamine. The molar ratio of amine to at least one alkylene oxide is usually 1:3 to 1:200 and is preferably in the range from 1:3 to 1:100.

In the case of the addition products of alkylene oxides to alcohols, phenols, acids or amines, the alkylene oxides can be added in the form of a mixed gas to the above-mentioned compounds, or the reaction is firstly carried out with ethylene oxide and subsequently with propylene oxide. It is likewise possible to firstly add propylene oxide and then ethylene oxide to said compounds. Apart from ethylene oxide and propylene oxide, it may also in each case be possible to add isobutylene oxide and/or n-butylene oxide. Subsequent addition of the alkylene oxides produces block copolymers.

In some cases, it may furthermore also be advantageous to terminally cap the free OH groups of the alkoxylation products. The terminal capping can be carried out, for example, using an alkyl radical with the formation of an ether group. For example, it is possible to react the alkoxylation products with alkylating agents such as dimethyl sulfate. The terminal OH groups can optionally also be esterified by reaction with carboxylic acids, e.g. acetic acid or stearic acid.

It is also possible to use a mixture of two or more polymers B).

The polymerization of the graft monomers A) to the polymers B) can be carried out in the presence or else in the absence of inert solvents or inert diluents. Since the polymerization in the absence of inert solvents or inert diluents in most cases leads to non-uniform polymers, the polymerization in an inert solvent or diluent is preferred. The concentration of the components A) and B) in the case of the graft polymerization presence of inert solvents or inert diluents is 10 to 80% by weight, preferably 20 to 70% by weight.

Suitable are, for example, those inert solvents or diluents in which the polymers B) can be suspended and which dissolve the graft monomers A). In these cases, the graft polymers are present in suspended form after the polymerization and can be readily isolated in solid form by filtration.

Suitable inert solvents are, for example, toluene, xylene, o-, m-, p-xylene and isomer mixtures, ethylbenzene, aliphatic hydrocarbons, such as pentane, hexane, heptane, octane, nonane, dodecane, cyclohexane, cyclooctane, methylcyclohexane and mixtures of said hydrocarbons, or gasoline fractions which do not contain polymerizable monomers. Also suitable are chlorinated hydrocarbons, such as chloroform, tetrachloromethane, hexachloroethane, dichloroethane and tetrachloroethane.

In the case of the described method in which the polymers B) are suspended in an inert diluent, the polymers B) are preferably used in anhydrous form.

A preferred method of preparing the graft polymers is solution polymerization and suspension polymerization, where the polymers B), the graft monomers A) and the graft polymer formed are present in at least dispersed form, preferably in dissolved form. For the solution polymerization, suitable solvents are, for example, inert solvents, such as methanol, ethanol, isopropanol, n-propanol, n-butanol, sec-butanol, tetrahydrofuran, dioxane, water and mixtures of said inert solvent.

The graft polymerization of the components A) and B) is usually carried out in an inert gas atmosphere with the exclusion of atmospheric oxygen. During the polymerization it is generally ensured that the reactants are thoroughly mixed. In the case of relatively small batches, for which certain dissipation of the heat of polymerization is ensured, the reactants, which are preferably present in an inert diluent, can be copolymerized batchwise by heating the reaction mixture to the polymerization temperature and then allowing the reaction to proceed. These temperatures are customarily in the range from 40 to 180° C.

The order in which the monomers a) to d) are added is arbitrary. For example, it is possible to add all or some of the monomers at the same time, or to add them successively. For example, it is possible to add the vinyl ester a) and the N-vinyllactam b) together, or firstly to add the vinyl ester a) and then the N-vinyllactam b), or vice versa first the N-vinyllactam b) and then the vinyl ester a).

The addition can be batchwise (e.g. as a single metered addition or at intervals in two or more portions during the course of the polymerization) or continuous. A continuous feed, viewed over the feed time, can, for example, be constant with respect to time (linear), increasing or decreasing, where the increase or the decrease may, for example, be linear, exponential, or obey a step function or another mathematical function.

These details relating to the method of the addition also apply analogously to the initiators, initiator activator, regulators and other customary additives and auxiliaries required for the polymerization mentioned below.

In order to be able to better control the progress of the polymerization reaction, in a preferred embodiment, the monomers a) to d) are added continuously or at intervals at the desired polymerization temperature to the mixture to be polymerized such that the polymerization can be readily controlled in the desired temperature range. Preference is given to an addition method of the monomers a) to d) in which, in the polymerization reactor, the polymers B) or at least part of the polymers B) are firstly introduced into the reactor and heated therein to the desired polymerization temperature with stirring. As soon as this temperature is reached, the monomers a) and b) and optionally c) and/or d), and the initiator and optionally a regulator are added over a period of, for example, about 1 to 10 hours, preferably 2 to 8 hours. Such a procedure is used, for example, in the case of the polymerization of the components A) and B) in an inert diluent in which the component B) is suspended, and also in the case of polymerization carried out in solution.

The solution or suspension polymerization in an aqueous medium involves, for example, introducing at least some of the polymers B) in aqueous medium, and adding, continuously or at intervals, the monomers a) to d) to the reaction mixture to be polymerized.

The polymerization reaction can be carried out continuously or batchwise.

In the polymerization reaction, the temperatures are usually in the range from 40 to 180° C., preferably 50 to 150° C. and in particular 60 to 110° C. As soon as the temperature during the polymerization reaction is above the boiling points of the inert diluent or solvent or of the monomers, the polymerization is advantageously carried out under pressure.

The preparation of the graft polymers can be carried out in customary polymerization equipment. For this, use is made, for example, of stirred-tank reactors fitted with an anchor, paddle, impeller or multistage impulse countercurrent stirrer. Particularly in the case of the polymerization in the absence of diluents, it may be advantageous to carry out the polymerization in kneaders. It may likewise be necessary to carry out the polymerization in a kneader if the process is carried out at high concentrations.

For the preparation of the graft polymers, the graft monomers A) are polymerized in the presence of polymers B), preferably by free-radical means. For this, initiators which form free radicals are co-used.

Suitable free-radical initiators are preferably always compounds which have a half-life of less than 3 hours at the polymerization temperature chosen in each case. If the polymerization is firstly started at a relatively low temperature and brought to an end at a relatively high temperature, then it is expedient to work with at least two initiators which disintegrate at different temperatures, namely firstly to use an initiator which disintegrates at a relatively low temperature for the start of the polymerization, and then to bring the main polymerization to an end using an initiator which disintegrates at a relatively high temperature. It is possible to use water-soluble and also water-insoluble initiators or mixtures of water-soluble and water-insoluble initiators. The water-insoluble initiators are then soluble in the organic phase.

For the temperature ranges given below it is possible, for example, to use the initiators listed therefore.

Temperature 40 to 60° C.:
  acetylcyclohexanesulfonyl peroxide, diacetyl peroxydicarbonate, dicyclohexyl peroxydicarbonate, di-2-ethylhexyl peroxydicarbonate, tert-butyl perneodecanoate, 2,2'-azobis(4-methoxy-2,4-dimethylvaleronitrile), 2,2'-azobis(2-methyl-N-phenylpropionamidine)dihydrochloride, 2,2'-azobis(2-methylpropionamidine)dihydrochloride.

Temperature 60 to 80° C.:
  tert-butyl perpivalate, dioctanoyl peroxide, dilauroyl peroxide, 2,2'-azobis(2,4-dimethylvaleronitrile).

Temperature 80 to 100° C.:
  dibenzoyl peroxide, tert-butyl per-2-ethylhexanoate, tert-butyl permaleate, 2,2'-azobis(isobutyronitrile), dimethyl 2,2'-azobisisobutyrate, sodium persulfate, potassium persulfate, ammonium persulfate.

Temperature 100 to 120° C.:
  bis(tert-butylperoxy)cyclohexane, tert-butyl peroxyisopropyl carbonate, tert-butyl peracetate, hydrogen peroxide.

Temperature 120 to 140° C.:
  2,2-bis(tert-butylperoxy)butane, dicumyl peroxide, di-tert-amyl peroxide, di-tert-butyl peroxide.

Temperature >140° C.:
  p-methane hydroperoxide, pinane hydroperoxide, cumene hydroperoxide and tert-butyl hydroperoxide.

If, in addition to said initiators, use is also made of salts or complexes of heavy metals, e.g. salts of copper, cobalt, manganese, iron, vanadium, nickel and chromium, or organic compounds, such as benzoin, dimethylaniline or ascorbic acid, then the half-lives of the free-radical initiators given can be reduced. Thus, for example, tert-butyl hydroperoxide can be activated with the addition of, for example, approximately 5 ppm of copper(II) acetylacetonate such that the polymerization can be carried out at a temperature as low as 100° C. The reducing component of redox catalysts can also be formed, for example, by compounds such as sodium sulfite, sodium hydrogen sulfite, sodium formaldehyde-sulfoxylate and hydrazine.

Based on the monomers a) to d) used in the polymerization, use is usually made of 0.01 to 20% by weight, preferably 0.05 to 10% by weight, of a polymerization initiator or a mixture of two or more polymerization initiators.

As redox components, 0.01 to 15% by weight, based on the total mass of monomers A) and polymers B), of the reducing compounds is added. Said heavy metals are used in the range from 0.1 to 100 ppm, preferably 0.5 to 10 ppm, based on said total mass.

It may be advantageous to use a combination of initiator, reducing agent and heavy metal as redox catalyst.

The graft polymerization of the graft monomers A) can also be carried out by the action of ultraviolet radiation, optionally in the presence of UV initiators. For the polymerization under the action of UV rays, the photoinitiators or sensitizers which are usually suitable for this purpose are used. These are, for example, compounds such as benzoin and benzoin ethers, α-methylbenzoin or α-phenylbenzoin. "Triplet sensitizers", such as benzyl diketals, can also be used. The UV-radiation sources are, for example, not only high-energy UV lamps, such as carbon arc lamps, mercury vapor lamps or xenon lamps, but also low-UV light sources, such as fluorescent tubes with a high blue component.

In order to prepare polymers with a low K value, the polymerization is expediently carried out in the presence of regulators. Suitable regulators are, for example, organic compounds which contain sulfur in bonded form. These include, for example, mercapto compounds, such as mercaptoethanol, mercaptopropanol, mercaptobutanol, mercaptoacetic acid, mercaptopropionic acid, butylmercaptan and dodecylmercaptan. Other suitable regulators are allyl compounds, such as allyl alcohol, aldehydes, such as formaldehyde, acetaldehyde, propionaldehyde, n-butyraldehyde and isobutyraldehyde, formic acid, ammonium formate, propionic acid, hydrazine sulfate and butenols. If the polymerization is carried out in the presence of regulators, they are required in amounts of 0.05 to 20% by weight, based on the monomers a) to d) used in the polymerization.

This gives graft polymers which, provided they are soluble in water, preferably have K values of from 5 to 150, preferably 10 to 150 and in particular 10 to 50 (determined in accordance with H. Fikentscher, Cellulosechemie, Volume 13. 58–64 and 71–74 (1932) using a 1% strength by weight solution in acetone at 25° C.).

The graft polymers which can be prepared by the above processes are usually colorless to brownish products. They are present during the polymerization in aqueous medium as dispersions or polymer solutions. Depending on the composition of the graft polymers in each case, they are usually low-viscosity to pasty aqueous solutions or aqueous dispersions.

In one possible embodiment of the invention, it is possible, following graft polymerization of the graft monomers A) in the presence of the polymers B), to at least partially hydrolyze the grafted-on vinyl esters a) of the graft polymer. Accordingly, the graft polymer is optionally subjected to at least partial hydrolysis. During this hydrolysis, the ester groups of the grafted-on vinyl esters a) are hydrolyzed. If hydrolysis is carried out, preference is given to hydrolyzing 1 to 100 mol %, in particular 1 to 50 mol % and particularly preferably 5 to 20 mol % of the ester groups. The hydrolysis leads to graft polymers which contain vinyl alcohol units.

Hydrolysis can be carried out by adding a base, such as sodium hydroxide solution or potassium hydroxide solution, or else by adding acids, such as mineral acids (for example hydrochloric acid, sulfuric acid or phosphoric acid), methanesulfonic acid, formic acid or lactic acid, and optionally heating the mixture. Said bases or acids are used in customary amounts, making further details superfluous.

The graft polymers are used according to the invention for washing and aftertreating textile ware, in particular textile ware which contains synthetic fibers. Examples of synthetic fibers are polyester fibers, polyamide fibers, polyacrylic fibers and other customary artificial fibers.

The graft polymers are used as grayness-inhibiting additive in laundry detergents. They are used, in particular, as additive to pulverulent or liquid detergents in amounts of, customarily, 0.05 to 15% by weight, preferably 0.1 to 5% by weight, based on the detergent formulations.

In the detergent liquor, they act as graying inhibitors and as an additive which promotes soil release. Of particular interest are the polymers according to the invention as additive in phosphate-free and phosphate-reduced powder detergents and in liquid detergents, and in laundry aftertreatment agents, e.g. fabric softeners. Phosphate-reduced detergents comprise less than 25% by weight of phosphate.

The graft copolymers can be added here in the form of a granulate, a paste, a high-viscosity composition, as a dispersion or as a solution in a solvent of the detergent formulation. The graft polymers can also be adsorbed to the surface of extenders, e.g. sodium sulfate, or builders (e.g. zeolites), and other solid auxiliaries of the detergent formulation.

Commercially available, pulverulent detergents, the phosphate content of which is below 25% by weight, and detergents which are predominantly phosphate-free comprise, as an essential constituent, surfactants, e.g. $C_8$–$C_{12}$-alkylphenol ethoxylates, $C_{12}$–$C_{20}$-alkanol ethoxylates, and block copolymers of ethylene oxide and propylene oxide. The polyalkylene oxides are substances which are solid at room temperature up to temperatures of from 50° C. to 60° C., and are readily water-soluble or water-dispersible. These are linear or branched reaction products of ethylene oxide with propylene oxide and/or isobutylene oxide which have a block structure, or which may also be constricted in a random manner. The end-groups of the polyalkylene oxides may optionally be capped. This is to be understood as meaning that the free OH groups of the polyalkylene oxides may be etherified and/or esterified and/or aminated and/or reacted with isocyanates.

Further suitable constituents of pulverulent detergents are anionic surfactants, such as $C_8$–$C_{12}$-alkylbenzenesulfonates, $C_{12}$–$C_{16}$-alkanesulfonates, $C_{12}$–$C_{16}$-alkyl sulfates, $C_{12}$–$C_{16}$-alkylsulfosuccinates and sulfated ethoxylated $C_{12}$–$C_{16}$-alkanols. Pulverulent detergents usually comprise 5 to 20% by weight of a surfactant or of a mixture of surfactants.

The pulverulent detergents can also optionally comprise polycarboxylic acids or salts thereof, for example tartaric acid or citric acid.

A further important constituent in detergent formulations is incrustation inhibitors. These substances are, for example, homopolymers of acrylic acid, methacrylic acid and maleic acid, or copolymers, e.g. copolymers of maleic acid and acrylic acid, copolymers of maleic acid and methacrylic acid, or copolymers of I) acrylic acid and/or methacrylic acid with II) acrylic esters, methacrylic esters, vinyl esters, allyl esters, itaconic esters, itaconic acid, methylenemalonic acid, methylenemalonic esters, crotonic acid and crotonic esters. Also suitable are copolymers of olefins and $C_1$–$C_4$-alkyl vinyl ethers. The molecular weight of the homo- and copolymers is 1,000 to 100,000. The incrustation inhibitors are used in an amount of from 0.5 to 10% by weight in detergents.

Further mixing constituents of detergents may also be corrosion inhibitors, monomeric, oligomeric and polymeric phosphonates, ether sulfonates based on saturated fatty alcohols, e.g. oleyl alcohol ethoxylate butyl ether and alkali metal salts thereof. Pulverulent detergents may optionally also comprise zeolites, e.g. in an amount of from 5 to 30% by weight. The detergent formulations may optionally also comprise bleaches. If bleaches are used, the amounts customarily employed are 3 to 25% by weight. The best known bleach is, for example, sodium perchlorate. Furthermore, the detergent formulations may optionally also comprise bleach activators, softeners, antifoams, perfume, optical brighteners and enzymes. Extenders, such as sodium sulfate, may optionally be present in detergents in an amount of from 10 to 30% by weight.

The graft polymers described may also be used as additive to liquid detergents. The liquid detergents comprise, as mixing component, liquid or also solid surfactants which are soluble or at least dispersible in the detergent formulation. The surfactant content of liquid detergents is usually in the range from 15 to 50% by weight. Suitable surfactants here are the products which are also used in pulverulent detergents, and liquid polyalkylene oxides and polyalkoxylated compounds. If the graft polymers are not directly miscible with the other constituents of the liquid detergent, it is possible, using a small amount of solubility promoters, e.g. water or a water-miscible organic solvent, e.g. isopropanol, methanol, ethanol, glycol, diethylene glycol or triethylene glycol, to prepare a homogeneous mixture.

The graft polymers are also suitable as additive in the aftertreatment of textile ware, in particular textile ware containing synthetic fibers. For this purpose, they are added to the final rinse bath of a washing machine cycle, it being possible to add them together with a customary laundry fabric softener, or—if a fabric softener is not desired—on their own instead of the fabric softener. The amounts used are 0.01 to 0.3 g/l of wash liquor. Use of the graft polymers in the final rinse of a washing machine cycle has the advantage that the laundry is soiled in the next wash cycle by detached soil particles present in the wash liquor to a far lesser extent than without the addition of the grayness-inhibitor agent in the preceding wash.

The graft polymers used according to the invention are characterized by the fact that the graying is effectively reduced, and also the soil is readily detached (good soil release). This combination of properties is not displayed by the compounds of the prior art.

EXAMPLES

The percentages given in the examples are percentages by weight.

The K values of the graft polymers were measured in accordance with H. Fikentscher, Cellulosechemie, Volume 13, 58–64 and 71–74 (1932) in acetone at a temperature of 25° C. and a polymer concentration of 1% by weight.

1. Preparation of the Graft Polymers

The polyethylene glycol used had a number-average molecular weight of 6000. Pluriol® E 6000 from BASF was used.

Graft Polymer 1:

40 g of polyethylene glycol were charged to a polymerization vessel and heated to 100° C. with stirring and under a gentle stream of nitrogen. At 100° C., with stirring, a feed of 45 g of vinyl acetate and 15 g of N-vinylcaprolactam was added dropwise over 6 hours, and a further feed of 0.75 g of tert-butyl peroctoate dissolved in 2.25 g of ethyl acetate was simultaneously added dropwise over 7 hours. Following the complete addition of both feeds, the mixture was afterpolymerized for a further 2 hours at 100° C. Subsequently, 0.3 g of tert-butyl peroctoate dissolved in 0.9 g of ethyl acetate in each case were added 3 times, and in each case the mixture was afterpolymerized for 2 hours. During the polymerization, the mixture was diluted with water. The ethyl acetate was then removed by distillation. The product was a gold-yellow, cloudy solution with a solids content of 75.6% and a K value of 24.4.

Graft Polymer 2:

40 g of polyethylene glycol were charged to a polymerization vessel and heated to 100° C. with stirring and under a gentle stream of nitrogen. At 100° C., with stirring, a feed of 40 g of vinyl acetate and 20 g of N-vinylcaprolactam was added dropwise over 6 hours, and a further feed of 0.75 g of tert-butyl peroctoate dissolved in 2.25 g of ethyl acetate was simultaneously added dropwise over 7 hours. Following the complete addition of both feeds, the mixture was afterpolymerized for a further 2 hours at 100° C. Subsequently, 0.3 g of tert-butyl peroctoate dissolved in 0.9 g of ethyl acetate in each case were added 3 times, and in each case the mixture was afterpolymerized for 2 hours. During the polymerization, the mixture was diluted with water. The ethyl acetate was then removed by distillation. The product was a orange-red, clear solution with a solids content of 76.6% and a K value of 20.3.

Graft Polymer 3:

40 g of polyethylene glycol were charged to a polymerization vessel and heated to 100° C. with stirring and under a gentle stream of nitrogen. At 100° C., with stirring, a feed of 40 g of vinyl acetate was added dropwise over 4 hours, then a feed of 20 g of N-vinylcaprolactam was added dropwise over 2 h and simultaneously a further feed of 0.75 g of tert-butyl peroctoate dissolved in 2.25 g of ethyl acetate over 7 hours. Following the complete addition of all feeds, the mixture was afterpolymerized for 2 hours at 100° C. Subsequently, 0.3 g of tert-butyl peroctoate dissolved in 0.9 g of ethyl acetate in each case was added 3 times, and in each case the mixture was afterpolymerized for 2 hours. After the polymerization, the mixture was diluted with water. The ethyl acetate was then removed by distillation. The product was an orange, cloudy solution with a solids content of 38.5% and a K value of 24.2.

Graft Polymer 4:

40 g of polyethylene glycol were charged to a polymerization vessel and heated to 100° C. with stirring and under a gentle stream of nitrogen. At 100° C., with stirring, a feed of 5 g of N-vinylcaprolactam was added dropwise over 30 min, then a feed of 55 g of vinyl acetate was added dropwise over 5.5 hours and simultaneously a further feed of 0.75 g of tert-butyl peroctoate dissolved in 2.25 g of ethyl acetate over 7 hours. Following the complete addition of all feeds, the mixture was afterpolymerized for 2 hours at 100° C. Subsequently, 0.3 g of tert-butyl peroctoate dissolved in 0.9 g of ethyl acetate in each case was added 3 times, and in each case the mixture was afterpolymerized for 2 hours. After the polymerization, the mixture was diluted with water. The ethyl acetate was then removed by distillation. The product was a yellow, clear solution with a solids content of 76.2% and a K value of 24.4.

Graft Polymer 5:

40 g of polyethylene glycol were charged to a polymerization vessel and heated to 100°C. with stirring and under a gentle stream of nitrogen. At 100° C., with stirring, a feed of 15 g of N-vinylcaprolactam was added dropwise over 1.5 hours, then a feed of 45 g of vinyl acetate was added dropwise over 4.5 hours and simultaneously a further feed of 0.75 g of tert-butyl peroctoate dissolved in 2.25 g of ethyl acetate over 7 hours. Following the complete addition of all feeds, the mixture was afterpolymerized for 2 hours at 100° C. Subsequently, 0.3 g of tert-butyl peroctoate dissolved in 0.9 g of ethyl acetate in each case was added 3 times, and in each case the mixture was afterpolymerized for 2 hours. After the polymerization, the mixture was diluted with water. The ethyl acetate was then removed by distillation. The product was a yellow, cloudy solution with a solids content of 76.9% and a K value of 23.5.

2. Investigation of the Grayness-Inhibiting Action

The grayness-inhibiting action of the graft polymers was tested as follows: polyester test fabric was subjected, together with a standard soiled fabric, to a series of 3 washes. The soiled fabric was replaced after each wash, the test fabric becoming more soiled after each wash. The degree of graying was the degree of whiteness of the white test fabric before and after washing. The degree of whiteness of the test fabric after the third wash was used to determine the degree of soiling. The degree of whiteness was determined by photometric measurement of the reflectance using an Elrepho 2000 photometer (Datacolor) at a wavelength of 460 mm (barium primary white standard in accordance with DIN 5033). The values were verified by repeating the experiment a number of times and determining the average value.

The test detergent used in the experiments was a pulverulent detergent and had the following composition.

| | |
|---|---|
| $C_{12}/C_{14}$-alkylbenzenesulfonate | 5.0% |
| $C_{13}/C_{15}$-Tallow fatty alcohol reacted with 7 mol equiv. of ethylene oxide | 5.0% |
| soap | 1.4% |
| Zeolite A | 30.0% |
| Polycarboxylate | 5.8% |
| Sodium metasilicate · 5 $H_2O$ | 3.6% |
| Sodium carbonate | 14.0% |
| Sodium sulfate | 6.0% |
| Sodium perborate · 4 $H_2O$ | 21.0% |
| Tetraacetylethylenediamine (TAED) | 6.0% |
| Carboxymethylcellulose Na salt | 1.2% |
| Graft polymer as described | 1.0% |

The washing conditions were as follows:

| | |
|---|---|
| Test device: | Launder-O-meter |
| Water hardness: | 3.0 mmol/l (Ca: Mg molar ratio = 3:1) |
| Liquor ratio: | 1:12.5 |
| Experiment temperature: | 60° C. |
| Wash time: | 30 min. |
| Detergent concentration: | 6.0 g/l |
| Polyester test fabric: | 2.5 g of PES 655 (Standard test fabric from Wäschereiforschungsanstalt Krefeld [Krefeld Laundry Research Institute]) |
| Soiled fabric: | 10 g of WFK10C (Standard soiled fabric from Wäschereiforschungsanstalt Krefeld) |

Table 1 summarizes the results. In comparative example 2, a graft copolymer according to EP-A 219 048, column 5, example 8 in Table 1, was used.

TABLE 1

| | Graying | |
|---|---|---|
| Example[1] | Graft copolymer | Reflectance [%] |
| 1C | None | 40.1 |
| 2C | as in EP-A 219048, No. 8 | 73.1 |
| 1 | Graft copolymer 1 | 74.3 |
| 2 | Graft copolymer 3 | 69.2 |
| Degree of whiteness before washing | 75.0 | |

[1] C for comparison

3. Investigation of the Soil Release Action

The graft polymers according to the invention were investigated with regard to their soil release action. For this purpose, polyester test fabrics were washed three times with the test detergent to which 1.0% by weight of the graft polymers according to the invention had been added. The fabrics pretreated in this way were dried and soiled by dripping on 0.2 g of spent engine oil (used oil). After a contact time of 24 hours, the test fabrics were washed with and without the addition of the graft polymers. The measurement of the soil release properties was the degree of whiteness of the test fabric before and after washing. The degree of whiteness was determined by photometric measurement of the reflectance as described above under No. 2 using an Elrepho 2000 photometer. The values were verified by repeating the experiment a number of times and calculating the average value.

The test detergent used in the experiments was identical to the detergent described in No. 2.

The washing conditions were identical to the conditions for No. 2, although no soiled fabric was used, and the test fabrics used were 5 g of Polyester 854 (standard test fabric from Wäschereiforschungsanstalt Krefeld).

Table 2 summarizes the results. In comparative example 2, the graft copolymer according to EP-A 219 048, column 5, example 8 in Table 1, was again used.

TABLE 2

| | Soil release effect | |
|---|---|---|
| Example[1] | Graft copolymer | Reflectance [%] |
| 3C | None | 33.8 |
| 4C | as in EP-A 219048, No. 8 | 40.7 |
| 5 | Graft copolymer 1 | 55.9 |
| 6 | Graft copolymer 3 | 65.8 |
| 7 | Graft copolymer 5 | 64.1 |
| Degree of whiteness before washing | 79.7 | |

[1] C for comparison

The tables show that without grayness-inhibiting additives, considerable graying occurs (Example 1C) and also the soil is poorly detached (Example 3C).

Although the graying inhibitors of the prior art are able to effectively reduce graying (Example 2C), they only have an inadequate soil release action (Example 4C).

By contrast, the graft polymers used according to the invention are notable for the fact that both the graying is effectively reduced and also the soil is readily detached. The improvement in the soil release was accordingly able to be achieved while retaining the good grayness-inhibiting action.

We claim:

1. A method, comprising:
   contacting a textile ware with a composition comprising a graft polymer that is comprised of
   A) polymerized units of a mixture of monomers comprising:
      a) 1 to 99% by weight of at least one vinyl ester,
      b) 1 to 99% by weight of at least one N-vinyllactam having from 5 to 13 carbon atoms in the lactam ring,
      c) 0 to 90% by weight of at least one other monoethylenically unsaturated monomer copolymerizable with the monomers a) and b), and
      d) 0 to 5% by weight of at least one monomer having at least two ethylenically unsaturated, nonconjugated double bonds in the molecule, wherein the % by weight is based on the total weight of A), grafted onto
   B) at least one polymer B) selected from the group consisting of a polyalkylene oxide which contains at least 3 units of a $C_2$–$C_4$-alkylene oxide, a polytetrahydrofuran which contains at least 3 tetramethylene oxide units, and mixtures thereof,
   wherein said graft polymer comprises from 10 to 90% by weight of A) and from 5 to 90% by weight of B) based on the total weight of graft polymer.

2. The method according to claim 1, wherein said N-vinyllactam having from 5 to 13 carbon atoms is a compound selected from the group consisting of N-vinylvalerolactam, N-vinylcaprolactam and N-vinyllaurolactam.

3. The method according to claim 1, wherein the copolymerizable monomer c) is present in an amount of 5 to 80% by weight.

4. The method according to claim 3, wherein the copolymerizable monomer c) is a member selected from the group consisting of monoethylenically unsaturated mono- and dicarboxylic acids (anhydrides) of 3 to 6 carbon atoms, N-vinylpyrrolidone, acrylonitrile, methacrylonitrile, N-vinylimidazole, a substituted N-vinylimidazole, an N-vinylimidazoline, vinylsulfonic acid, allylsulfonic acid, methallylsulfonic acid, styrenesulfonic acid, 3-sulfopropylacrylate, 3-sulfopropylmethacrylate and 2-acrylamido-2-methylpropanesulfonic avid.

5. The method according to claim 1, wherein the cross-linking monomer d) having at least two ethylenically unsaturated, nonconjugated double bonds is present in an amount of 0.05 to 2% by weight.

6. The method according to claim 5, wherein monomer c) is a member selected from the group consisting of methylenebisacrylamide, esters of acrylic acid and methacrylic acid with polyhydric alcohols, divinylbenzene, divinyldioxane, pentaerythritol triallyl ether and pentaallyl sucrose.

7. The method according to claim 1, wherein the polyalkylene oxide has a number average molecular weight ranging from 200 to 50,000.

8. The method according to claim 1, wherein the polytetrahydrofuran contains from 3 to 200 tetramethyleneoxide units.

9. The method according to claim 1, wherein the vinyl ester a) is vinyl acetate or a vinyl propionate or a mixture thereof.

10. The method according to claim 2, wherein the N-vinyllactam is N-vinylcaprolactam.

11. The method according to claim 1, wherein the vinyl esters a) of the graft polymer are at least partially hydrolyzed.

12. The method according to claim 1, wherein the polyalkylene oxide is polyethyleneglycol.

13. The method according to claim 1, wherein the graft polymer has a K-value ranging from 5 to 150 as determined in accordance with H. Fikentscher using a 1% strength by weight solution in acetone at 25° C.

14. The method according to claim 1, wherein the composition consists of the graft polymer.

15. The method according to claim 1, further comprising: washing or after-treating a textile article.

16. The method according to claim 15, wherein the textile article is contacted with the composition during washing or after-treatment.

17. The method according to claim 16, wherein the graft copolymer is present in an amount that is effective for inhibiting the grayness of the textile article.

18. The method according to claim 16, wherein the composition is a laundry detergent comprising one or more of a surfactant or a builder, optionally one or more other additives, and 0.1 to 5% by weight of the graft polymer.

* * * * *